(12) United States Patent
Zeng et al.

(10) Patent No.: US 10,088,553 B2
(45) Date of Patent: Oct. 2, 2018

(54) METHOD OF AUTOMATIC SENSOR POSE ESTIMATION

(71) Applicant: GM GLOBAL TECHNOLOGY OPERATIONS LLC, Detroit, MI (US)

(72) Inventors: Shuqing Zeng, Sterling Heights, MI (US); Xian Zhang, Wixom, MI (US); Xiaofeng F. Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 15/069,547

(22) Filed: Mar. 14, 2016

(65) Prior Publication Data

US 2017/0261599 A1    Sep. 14, 2017

(51) Int. Cl.
*G01S 7/40* (2006.01)
*B60W 40/105* (2012.01)
*G01S 13/08* (2006.01)
*G01S 13/58* (2006.01)

(52) U.S. Cl.
CPC ......... *G01S 7/4004* (2013.01); *B60W 40/105* (2013.01); *G01S 13/08* (2013.01); *G01S 13/588* (2013.01); *B60W 2520/10* (2013.01); *B60W 2520/12* (2013.01); *B60W 2520/14* (2013.01)

(58) Field of Classification Search
None
See application file for complete search history.

(56) References Cited

U.S. PATENT DOCUMENTS

| | | | | |
|---|---|---|---|---|
| 5,964,822 A | * | 10/1999 | Alland | G01S 7/4004 342/90 |
| 7,813,851 B2 | * | 10/2010 | DeMersseman | G01B 21/24 180/282 |
| 2007/0182623 A1 | * | 8/2007 | Zeng | G01S 7/4026 342/174 |
| 2010/0017128 A1 | * | 1/2010 | Zeng | B60W 40/105 701/301 |
| 2011/0153268 A1 | * | 6/2011 | Jordan | G01S 13/931 702/151 |
| 2012/0290169 A1 | * | 11/2012 | Zeng | G01S 7/4026 701/30.2 |
| 2013/0218398 A1 | * | 8/2013 | Gandhi | B60R 16/02 701/31.1 |
| 2015/0276923 A1 | | 10/2015 | Song et al. | |

* cited by examiner

*Primary Examiner* — Charles Garber
*Assistant Examiner* — Alia Sabur
(74) *Attorney, Agent, or Firm* — Cantor Colburn LLP (57) ABSTRACT

A method and sensor system are disclosed for automatically determining object sensor position and alignment on a host vehicle. A radar sensor detects objects surrounding the host vehicle in normal operation. Static objects are identified as those objects with ground speed approximately equal to zero. Vehicle dynamics sensors provide vehicle longitudinal and lateral velocity and yaw rate data. Measurement data for the static objects—including azimuth angle, range and range rate relative to the sensor—along with the vehicle dynamics data, are used in a recursive geometric calculation which converges on actual values of the radar sensor's two-dimensional position and azimuth alignment angle on the host vehicle.

16 Claims, 4 Drawing Sheets

METHOD OF AUTOMATIC SENSOR POSE ESTIMATION

BACKGROUND OF THE INVENTION

1. Field of the Invention

This invention relates generally to object detection sensors on vehicles and, more particularly, to a method for automatically determining an object sensor's pose—including its position and mounting angle on a host vehicle—by using vehicle dynamics data and detected static object data in a recursive calculation.

2. Discussion of the Related Art

Many modern vehicles include object detection sensors, which are used to enable collision warning or avoidance and other active safety applications. The object detection sensors may use any of a number of detection technologies—including short range or long range radar, cameras with image processing, laser or LIDAR, and ultrasound, for example. The object detection sensors detect vehicles and other objects in the path of the host vehicle, and the application software uses the object detection information to issue warnings or take actions as appropriate.

In order for the application software to perform optimally, the object detection sensors must be aligned properly with the vehicle. For example, if a sensor detects an object that is actually in the path of the host vehicle but, due to sensor misalignment, the sensor determines that the object is slightly to the left of the path of the host vehicle, this can have significant consequences for the application software. Similarly, an object sensor's true position on the host vehicle is also important in object detection calculations. Even if there are multiple object detection sensors on a vehicle, it is important that their positions and alignments are known, so as to minimize or eliminate conflicting or inaccurate sensor readings.

In many vehicles, the object detection sensors are integrated directly into the front or rear fascia of the vehicle. This type of installation is simple, effective, and aesthetically pleasing, but it has the disadvantage that there is no practical way to physically adjust the position or alignment of the sensors. Thus, if a sensor becomes misaligned with the vehicle's true heading, due to damage to the fascia or age- and weather-related warping, there has traditionally been no way to correct the misalignment, other than to replace the entire fascia assembly containing the sensors. In other situations, an object sensor may be placed on a vehicle without an accurate determination of the sensor's location and orientation, thus leading to uncertainty in object detection calculations.

SUMMARY OF THE INVENTION

In accordance with the teachings of the present invention, a method and sensor system are disclosed for automatically determining object sensor position and alignment on a vehicle. A radar sensor detects objects surrounding a host vehicle in normal operation. Static objects are identified as those objects with ground speed approximately equal to zero. Vehicle dynamics sensors provide vehicle longitudinal and lateral velocity and yaw rate data. Measurement data for the static objects—including azimuth angle, range and range rate relative to the sensor—along with the vehicle dynamics data, are used in a recursive geometric calculation which converges on actual values of the radar sensor's two-dimensional position and azimuth alignment angle on the host vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to automatic object sensor pose estimation is merely exemplary in nature, and is in no way intended to limit the invention or its applications or uses.

Object detection sensors have become commonplace in modern vehicles. Such sensors are used to detect objects which are in or near a vehicle's driving path—forward, rearward or to the side. Many vehicles now integrate object detection sensors into exterior body trim panels in a way that precludes mechanical adjustment of the sensors. A method and system are disclosed herein for automatically calibrating sensor position and alignment in software, thus ensuring accurate sensor readings with no need for mechanical adjustment of the sensors.

Figure 1:
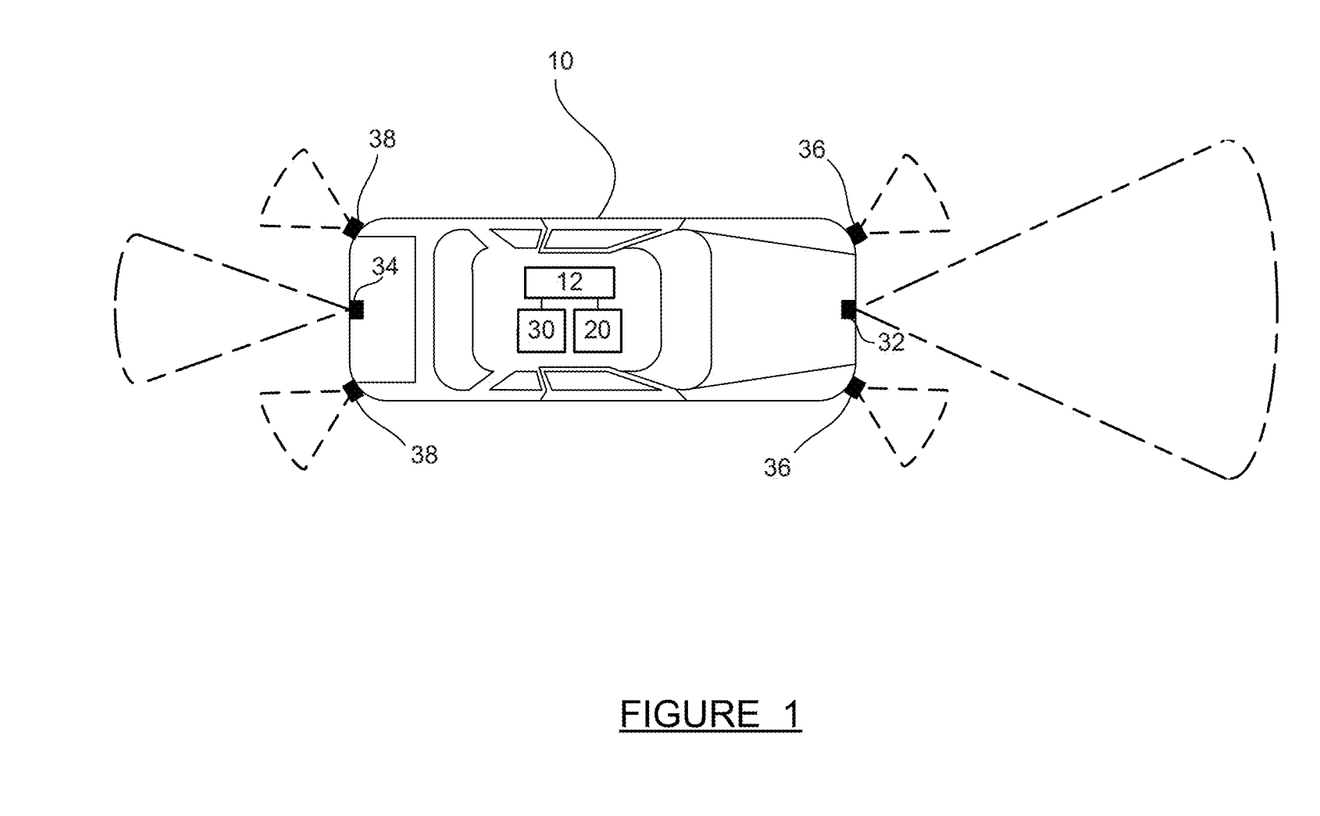
FIG. 1 is a top-view illustration of a vehicle, including several object detection sensors, vehicle dynamics sensors and a processor for communicating therebetween.

FIG. 1 is a top-view illustration of a vehicle 10, including several sensors which can be used for object detection, lane keeping, and other active safety applications. The vehicle 10 includes a processor 12—which may be a dedicated object detection processor, or a processor shared with other vehicle systems and applications. The processor 12 is in communication with a vehicle dynamics module 20 and an object detection module 30. The vehicle dynamics module 20 includes a plurality of vehicle dynamics sensors—such as longitudinal and lateral accelerometers and a yaw rate sensor—and receives data such as vehicle speed from a communications bus. Using the vehicle dynamics sensors and other available data, the vehicle dynamics module 20 continuously computes vehicle dynamics data—including, at a minimum, vehicle longitudinal and lateral velocity, and yaw rate.

The object detection module 30 communicates with one or more object detection sensors. The vehicle 10 is shown with a front center object sensor 32, a rear center object sensor 34, front corner (L and R) object sensors 36 and rear corner (L and R) object sensors 38. The vehicle 10 may include more or fewer object sensors—including additional locations (not shown) such as left and right side sensors (mounted in side view mirrors or door panels, for example). Some or all of the object sensors 32-38 are commonly integrated into a bumper fascia or other body panel of the vehicle 10. The functions of the object detection module 30 may be integrated with the processor 12.

The object sensors 32-38 may be used for detecting objects which define lane or roadway boundaries—such as curbs, guard rails and median walls. The object sensors 32-38 may also be used for detecting other static objects surrounding the roadway—such as trees, light poles, mail boxes and signs. In addition, the object sensors 32-38 are used to detect moving objects in proximity to the vehicle 10—such as other vehicles, pedestrians, bicycles, wildlife, etc. Many different types of object sensor technology are used on modern vehicles—including radar, light detection and ranging (LiDAR), ultrasound, etc. For the purposes of the invention disclosed herein, the object sensors 32-38 can be considered to be radar sensors or any other sensor technology which provides both range and range rate of target objects. The object sensors 32-38 may include long range radar (LRR) and short range radar (SRR) sensors.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The processor 12, the vehicle dynamics module 20 and the object detection module 30—which may be separate devices or a single device—are programmed with a set of computational and control algorithms, including resident software program instructions and calibrations stored in memory and executed to provide the desired functions. The algorithms may be executed during preset loop cycles, or in response to occurrence of an event. Algorithms are executed, such as by a central processing unit, and are operable to monitor inputs from sensing devices and other networked control modules, execute diagnostic routines, and control operation of other vehicle systems—such as steering, brakes, display and warning devices, etc.

Regardless of how many object sensors are provided on the vehicle 10, it is important that the pose (position and azimuth orientation) of the sensors is accurately known. Sensor position and orientation are important both for object data used in lane keeping applications (such as curbs and guard rails) and for object data used in collision avoidance and other autonomous driving applications (such as other vehicles). The invention discussed below provides a technique for automatically determining the position and orientation of the object sensors 32-38 on the vehicle 10 using data which is readily available.

Figure 2:
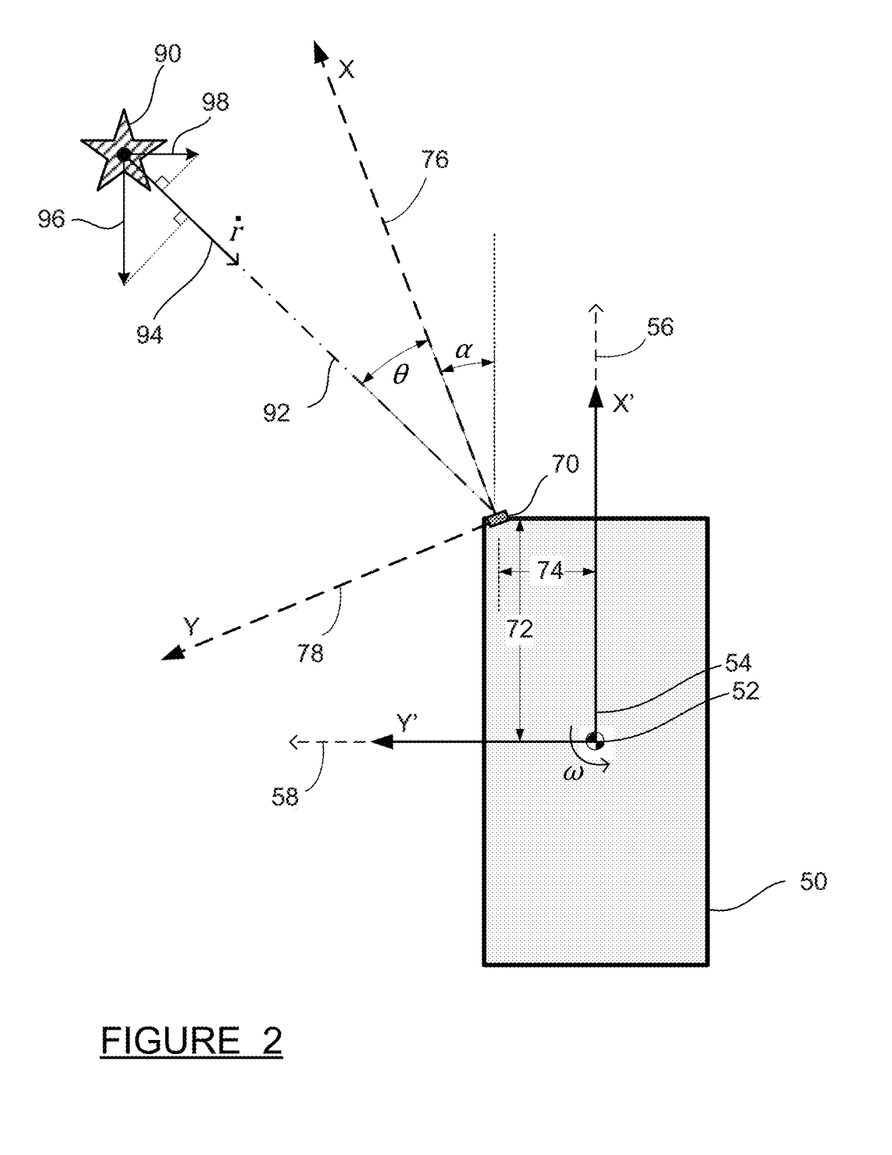
FIG. 2 is a top-view illustration of a host vehicle with a radar sensor detecting a static object and showing the geometric relationships used in a calculation of the radar sensor's pose on the host vehicle.

FIG. 2 is a top-view illustration of a host vehicle 50 with a left front radar sensor 70 detecting a static object 90 and showing the geometric relationships used in a calculation of the radar sensor's pose on the host vehicle 50. The host vehicle 50 is representative of the vehicle 10 of FIG. 1, and the radar sensor 70 is representative of the left front object sensor 36 of FIG. 1. The calculations discussed below, relative to FIG. 2, are equally applicable to any of the object sensors shown on the vehicle 10, or an object sensor located at any position and orientation on the vehicle 50—including straight forward, straight rearward, directly to the left or right side, or at any vehicle corner.

The vehicle 50 has a center of gravity 52 and a local coordinate system 54 designated as (X',Y'). The vehicle 50 has a longitudinal velocity $V_x$, denoted by reference numeral 56, and a lateral velocity $V_y$, denoted by reference numeral 58. The vehicle 50 also has a yaw rate $\omega$ as shown. The values of $V_x$, $V_y$ and $\omega$ are determined and provided by the vehicle dynamics module 20 as described relative to FIG. 1.

The radar sensor 70 is located at a position (a,b) on the host vehicle 50, where a is the longitudinal distance forward of the center of gravity 52, designated by reference numeral 72, and b is the lateral distance to the left of the center of gravity 52, designated by reference numeral 74. The radar sensor 70 has a local coordinate system defined by X-axis 76 and Y-axis 78, where the radar sensor has an azimuth orientation angle $\alpha$ defined as a counterclockwise rotation of the radar sensor's reference frame relative to the host vehicle's local coordinate system 54. All directional conventions described here are as viewed from above.

Only static objects are used in the pose estimation calculations described below. This is because moving objects, such as other vehicles, have a ground speed which is unknown to the host vehicle 50, and may be changing. Of course, the ground speed of any detected object may be calculated using data from the radar sensor 70, but this object velocity calculation adds extra variables into the computation. By using only static objects, the number of unknowns involved in the sensor pose estimation calculations is reduced such that the pose (a,b,$\alpha$) of the radar sensor 70 can be determined through recursive computations over a number of measurement cycles.

Before performing the ongoing recursive pose estimation calculation using each new set of sensor measurement data, an object filtering step is performed to identify the set of static objects. The absolute velocity or ground speed of any object detected by the radar sensor 70 is calculated, using measurement data from the radar sensor 70 and nominal position and orientation values for the radar sensor 70, as would be understood by those skilled in the art. Static objects are identified as those objects having a ground speed of zero or very close to zero, and only these static objects are used in the sensor pose estimation calculations. Although only one static object 90 is shown in FIG. 2 and discussed in the calculations below, it is to be understood that the fidelity of the calculations is improved by using several static objects as would commonly be present in many driving scenarios.

The static object 90 has a position defined by a range r (denoted by reference numeral 92) and an azimuth angle $\theta$, both of which are measured by the radar sensor 70. The angle $\theta$ is defined as the angle between the positive X-axis of the radar sensor's local coordinate system and the vector from the radar sensor 70 to the static object 90, as shown. The static object 90 also has a range rate (denoted by reference numeral 94), which is also measured by the radar sensor 70. The range rate $\dot{r}$ can be resolved into a pair of orthogonal vectors 96 and 98, where the vector 96 is the apparent longitudinal velocity of the static object 90 relative to the host vehicle 50 and the vector 98 is the apparent lateral velocity of the static object 90 relative to the host vehicle 50.

Using basic geometry and kinematics, the velocity vector 96 can be written as:

$$V_{96} = V_x - b\omega \quad (1)$$

and the velocity vector 98 can be written as:

$$V_{98} = V_y + a\omega \quad (2)$$

where all variables in Equations (1) and (2) have been defined above.

From the geometric relationships defined in Equations (1) and (2), a pair of calculations can be performed recursively upon arrival of each new set of sensor measurement data. In the first calculation, the azimuth orientation angle α is assumed to be known (from a default setting, or from a previous cycle of the recursive calculation), and the position values a and b are calculated. In the second calculation, the position values a and b are assumed to be known (from a default setting, or from a previous cycle of the recursive calculation), and the azimuth orientation angle α is calculated. Over a period of time (nominally one minute to a few minutes), with measurement data arriving several times per second, these calculations converge to yield the actual values of the sensor pose (a,b,α).

The first calculation, where the azimuth orientation angle α is assumed to be known and the position values a and b are calculated, can be set up as follows. Equations (1) and (2) and their geometric relationship to the range rate vector $\dot{r}$ yield the following:

$$-\dot{r}=(V_x-b\omega)\cdot\cos(\theta+\alpha)+(V_y+a\omega)\cdot\sin(\theta+\alpha) \quad (3)$$

where all variables in Equation (3) have been defined above.

Equation (3) can be rewritten as:

$$\dot{r} + V_x \cdot \cos(\theta + \alpha) + V_y \cdot \sin(\theta + \alpha) = \omega[-\sin(\theta + \alpha) \ \cos(\theta + \alpha)]\begin{bmatrix} a \\ b \end{bmatrix} \quad (4)$$

where all variables in Equation (4) have been defined above, and only the position values a and b are unknown. Equation (4) is advantageously written to separate the unknowns a and b into a vector which can be obtained using regression calculations over a number of measurement cycles.

To set up the regression calculation, it is helpful to define the following:

$$Y = \begin{bmatrix} \dot{r}_l + V_x \cdot \cos(\theta_i + \alpha) + V_y \cdot \sin(\theta_i + \alpha) \\ \ldots \end{bmatrix} \quad (5)$$

where $\dot{r}_i$ and $\theta_i$ are values of range rate and azimuth angle of the static object 90 for a sensor measurement cycle i, Y is a vector of length n, and n is the number of sensor measurement cycles used in the calculation. The value of n can be chosen as appropriate to achieve convergence of the calculation, while not being so large as to make the computations overly complex. The value of n may be in the thousands, covering 10-20 minutes (more or less) of object sensor data, and in one embodiment a value of n=6000 (10 minutes at 10 sensor measurements per second) was shown to yield good results. The value of n is a configurable parameter which can be selected to achieve the best results in a given implementation. The sensor measurements for each cycle i are stored in a fixed-length buffer (of length n), such that the oldest measurement cycle (the one that is, say, 10 minutes old) drops out of the buffer when a new measurement cycle is received.

Just as Equation (5) defines a vector for the left-hand side of Equation (4), the right-hand side of Equation (4) can be defined as:

$$X = \begin{bmatrix} -\omega \sin(\theta_i + \alpha) & \omega \cos(\theta_i + \alpha) \\ \ldots & \ldots \end{bmatrix} \quad (6)$$

and $$\beta = \begin{bmatrix} a \\ b \end{bmatrix} \quad (7)$$

where $\theta_i$ is again the value of the azimuth angle of the static object 90 for a measurement cycle i, and X is a matrix of size 2×n, where the two columns of X are as shown in Equation (6) and n is the number of sensor measurement cycles used in the calculation.

Substituting Equations (5)-(7) into Equation (4) yields:

$$X\cdot\beta=Y \quad (8)$$

Equation (8) can be iteratively solved in a regression calculation using static object measurements over a period of time. It should be remembered that, in Equation (8), all of the data in X and Y are known values—α is given, and all other values come from sensor measurements or from vehicle dynamics. Thus, only the vector β containing the position values a and b is unknown, and can be solved for.

The second calculation, where the position values a and b are assumed to be known and the azimuth orientation angle α is to be determined, can be set up as follows. First, Equation (3) can be rewritten as:

$$-\dot{r}=[(V_x-b\omega)\cos\theta+(V_y+a\omega)\sin\theta]\cos\alpha+ \\ [-(V_x-b\omega)\sin\theta+(V_y+a\omega)\cos\theta]\sin\alpha \quad (9)$$

To facilitate solving for the orientation angle α, the following definitions can be established:

$$A = \begin{bmatrix} (V_x - b\omega)\cos\theta_1 + & -(V_x - b\omega)\sin\theta_1 + \\ (V_y - a\omega)\sin\theta_1 & (V_y + a\omega)\cos\theta_1 \\ \ldots & \ldots \\ \ldots & \ldots \\ (V_x - b\omega)\cos\theta_n + & -(V_x - b\omega)\sin\theta_n + \\ (V_y - a\omega)\sin\theta_n & (V_y + a\omega)\cos\theta_n \end{bmatrix} \quad (10)$$

$$x = \begin{bmatrix} \cos\alpha \\ \sin\alpha \end{bmatrix} \quad (11)$$

and $$c = [-\dot{r}_1 \ \ldots \ \ldots \ -\dot{r}_n] \quad (12)$$

Substituting Equations (10)-(12) into Equation (9), the x vector can be solved through quadratic constrained least squares as follows:

$$\min_x \|Ax-c\|^2 \quad (13)$$

subject to the constraint:

$$\|x\|^2=1 \quad (14)$$

In the same manner as described above, A and c are populated with known values at each sensor measurement cycle, and the recursive least squares calculation converges on the value of x, yielding the azimuth orientation angle α.

The pose estimation techniques described above have been implemented on vehicles, tested in real world driving conditions, and demonstrated to be effective. These tests included purposely changing the azimuth orientation angle α by several degrees, driving the vehicle, and observing the calculations converge on the correct value of the new orientation angle α. Similarly, radar sensors were positioned at corner locations on a vehicle (front and rear, left and right), where actual values of a and b were on the order of 1-2 meters, but the initial default values of a and b were set equal to zero. Again, through normal driving, the calculations converged on the correct values of the sensor position (a,b).

The tests described above demonstrate that the disclosed sensor pose estimation technique can not only adaptively learn of any change in position and orientation, but the technique can also be used to automatically learn a sensor's position and orientation following vehicle assembly or repair, with no extra measurement or calibration steps required. And again, it is emphasized that these pose estimation calculations are performed using vehicle and object data that is already available. Furthermore, although the sensor measurement buffer may be sized for statistical robustness to contain (for example) 10 minutes' worth of measurement data, the tests demonstrated convergence on the actual pose (a,b,α) in just 3-4 minutes, even when the actual pose was dramatically different than the initial default values.

Figure 3:
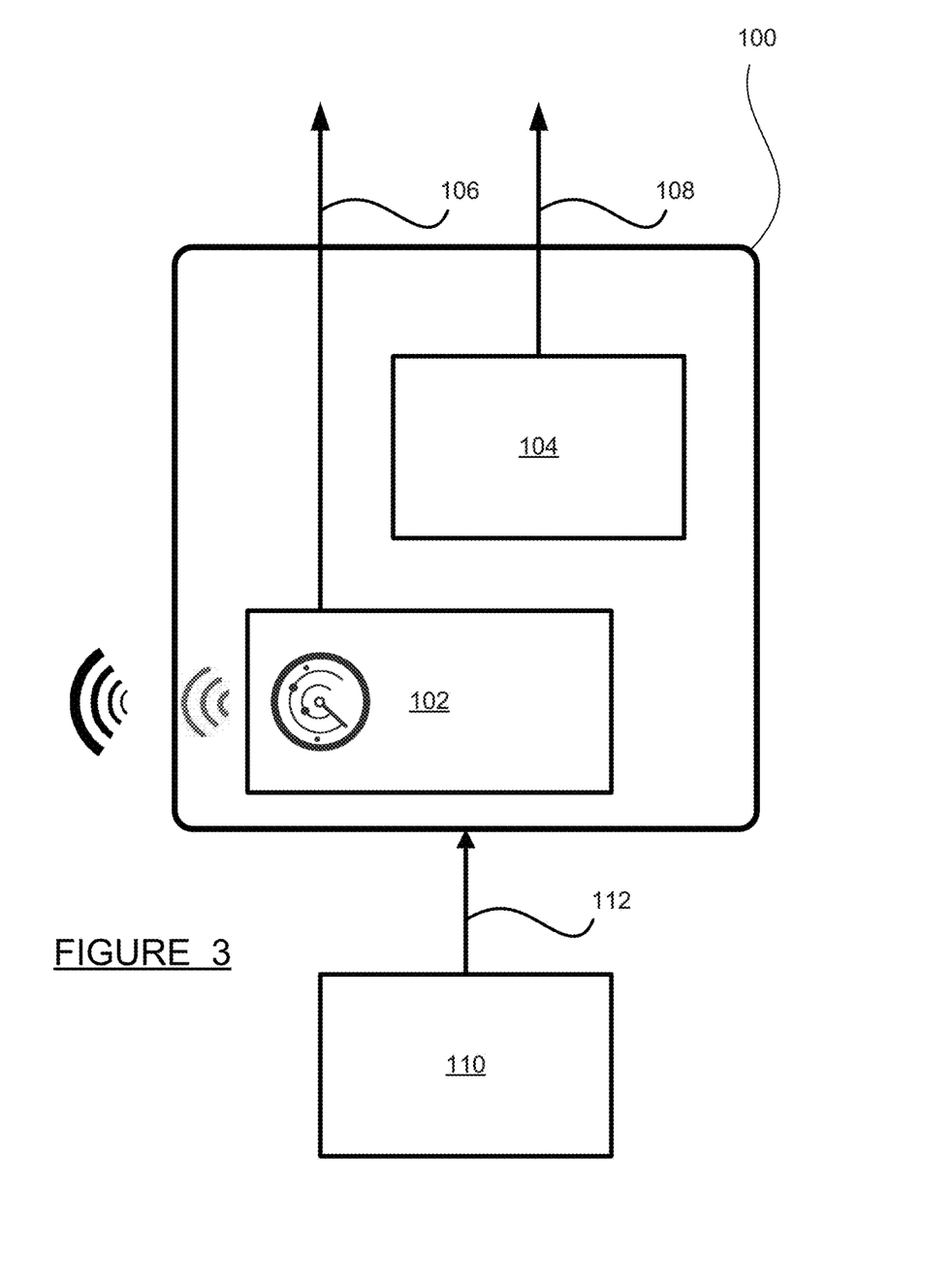
FIG. 3 is a schematic diagram of a smart sensor which, given vehicle dynamics data as input, can learn its pose on the host vehicle.

FIG. 3 is a schematic diagram of a smart sensor 100 which, given vehicle dynamics data as input, can automatically and continuously estimate its pose on the vehicle 10 or the host vehicle 50. The smart sensor 100 includes a sensor measurement core 102, which transmits radar signals and receives radar returns to identify objects in the host vehicle's vicinity. The smart sensor 100 also includes a mounting pose estimator 104, which automatically and continuously computes the mounting pose (a,b,α) of the smart sensor 100. The mounting pose estimator 104 uses static object data from the sensor measurement core 102, along with vehicle dynamics data, in the sensor pose calculations—as described in detail above. The vehicle dynamics data is provided to the smart sensor 100 on line 112 from a module 110, which may be the vehicle dynamics module 20 shown on FIG. 1 and discussed previously.

The measurement core 102 provides object azimuth angle (θ), range (r) and range rate (ṙ) on line 106—for each detected object—which are corrected to the actual sensor pose. In this way, the smart sensor 100 delivers automatically calibrated object data, without requiring any re-programming of a central object detection module such as the object detection module 30. The smart sensor also outputs, on line 108, the sensor's mounting pose parameters (a,b, α)—for use in any other required calculations, reports or advisories. For example, the pose parameters may be compared to nominal ranges for each sensor, and out-of-range values may result in a driver notification or service advisory.

The smart sensor 100 of FIG. 3 is one embodiment of the disclosed invention. Another embodiment of the disclosed invention is as shown in FIG. 1, where the processor 12 or the object detection module 30 automatically and continuously estimates the pose of all of the sensors 32-38 on the vehicle 10. It should be clear, to one skilled in the art, how the processor 12 or the object detection module 30 can calculate each sensor's pose based on the available data from the vehicle dynamics module 20 and each sensor's measurement of static objects, using the techniques described in detail above.

Figure 4:
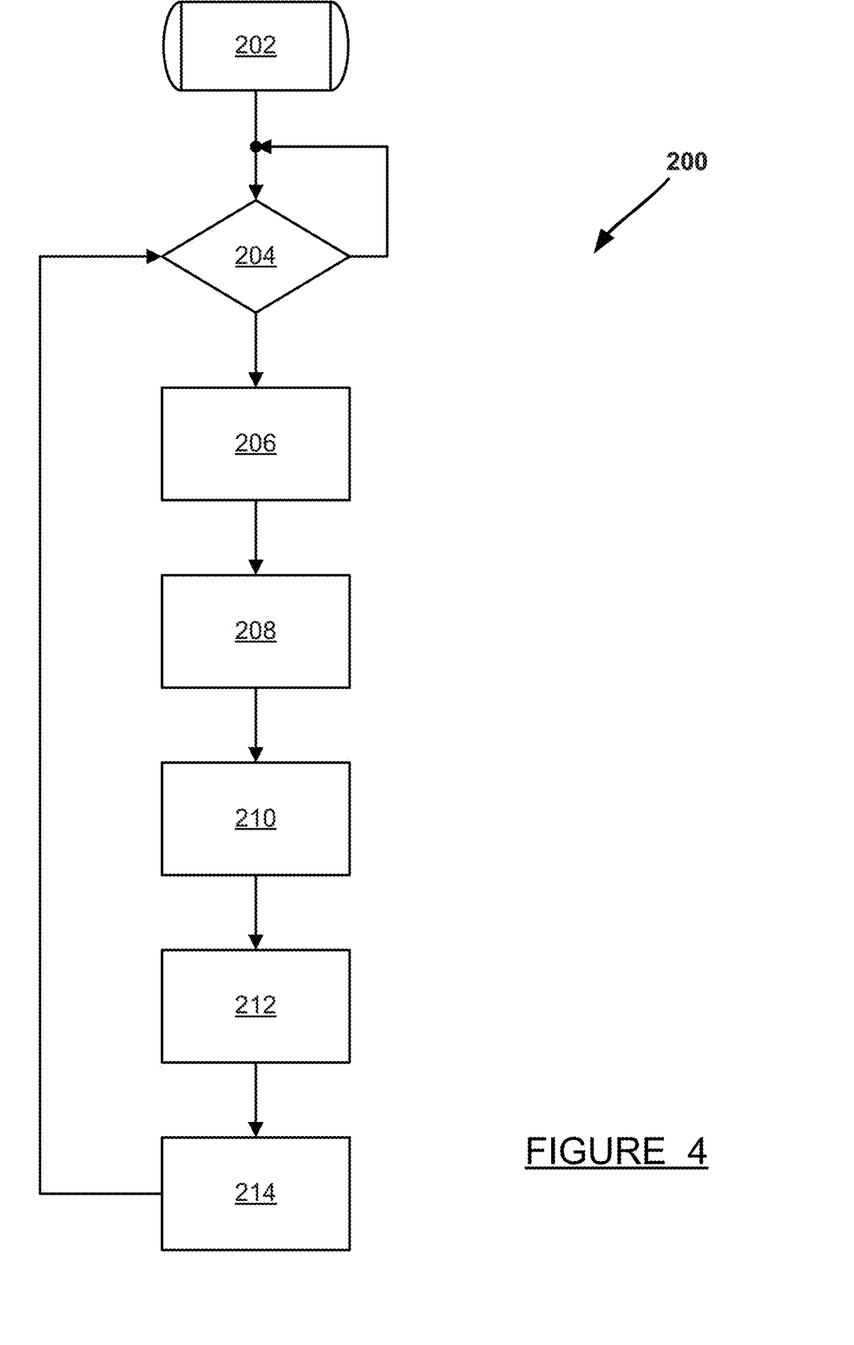
FIG. 4 is a flowchart diagram of a method for automatic estimation of a radar sensor's pose on the host vehicle.

FIG. 4 is a flowchart diagram 200 of a method for automatic estimation of a radar sensor's pose on a host vehicle. The method of the flowchart diagram could be programmed as an algorithm on the processor 12 or the object detection module 30 (and applied to all of the vehicle's radar sensors), or programmed in the mounting pose estimator 104 of the smart sensor 100.

Table 1 is provided as a key associated with the flowchart diagram 200 described with reference to FIG. 4, wherein the numerically labeled boxes and the corresponding functions are set forth as follows.

TABLE 1

| BOX # | BOX DESCRIPTION/FUNCTION |
|---|---|
| 202 | Start |
| 204 | Has new object sensor measurement data arrived? |
| 206 | Provide vehicle longitudinal and lateral velocities and yaw rate |
| 208 | Identify static objects from object data |
| 210 | Learn sensor's mounting position values (a, b) |
| 212 | Learn sensor's azimuth orientation angle (α) |
| 214 | Recalculate location of objects detected by the sensor |

The method begins at start box 202. At decision diamond 204, it is determined whether new object sensor measurement data has arrived. If not, the process loops back above the decision diamond 204 and waits until new data arrival. When new object sensor data arrives, at box 206 the vehicle's velocities (longitudinal $V_x$ and lateral $V_y$) and yaw rate ω are provided. As discussed above, $V_x$, $V_y$ and ω are calculated by the vehicle dynamics module 20 based on data provided by the vehicle dynamics sensors and other vehicle state data available on a communications bus.

At box 208, object data from the radar sensor 70 of FIG. 2 (or the sensors 32-38 of FIG. 1) is acquired, and static objects are determined based on a zero or near-zero ground speed. An object ground speed substantially equal to zero, indicative of a static object, is defined as a ground speed below a threshold, such as 0.05 meters/second. At box 210, the sensor's mounting position values (a,b) are estimated using the recursive learning calculations of Equations (5)-(8). At box 212, the sensor's azimuth orientation angle (α) is estimated using the recursive learning calculations of Equations (10)-(14). At box 214, the updated values of the sensor's pose (a,b,α) are stored for usage in the next iteration of the recursive calculation, and the sensor position and orientation values are also used to recalculate the location of objects detected by the sensor (misalignment compensation). Sensor pose values which are significantly outside of expected ranges may also be flagged as a diagnostic trouble code (DTC), communicated to the driver as an alert, transmitted via a telematics system to a repair facility for follow-up, etc.

Following the sensor pose data storage and misalignment compensation at the box 214, the method returns to the decision diamond 204 to await the next sensor data arrival. As discussed in detail previously, the method of the flowchart diagram 200 runs continuously during vehicle operation, producing ever more refined values of each sensor's pose. Even if vehicle damage causes a sudden change in sensor position and/or orientation, or if a new sensor is installed with default pose values, the recursive calculation technique will converge on accurate sensor position and orientation values within just a few minutes of vehicle operation, thus ensuring the accuracy of object detection data used in downstream applications.

The automatic sensor pose estimation method described herein provides a simple and effective way to determine the position and alignment of object detection sensors, including those which have no means of physical adjustment, thus improving the performance of applications which use the sensor data. The pose estimation technique also avoids the expensive replacement of an otherwise usable fascia component in the event of fascia damage resulting in sensor displacement, and avoids the need for a vehicle service visit to reposition or recalibrate sensors which have been displaced.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating a pose of an object detection sensor on a host vehicle, said method comprising:
   providing vehicle dynamics data from a vehicle dynamics module on the host vehicle to a processor, where the vehicle dynamics data includes a longitudinal velocity, a lateral velocity and a yaw rate of the host vehicle;
   providing object data from an object sensor to the processor, where the object data includes a range, a range rate and an azimuth angle of each detected object relative to the object sensor;
   identifying, using the processor, static objects from the object data;
   calculating, using the processor, a longitudinal position and a lateral position of the object sensor on the host vehicle based on a recursive calculation using position and motion of the static objects relative to the object sensor;
   calculating an azimuth orientation of the object sensor on the host vehicle based on a recursive calculation using position and motion of the static objects relative to the object sensor, including using an equation defining the range rate of each static object in terms of a longitudinal component and a lateral component, writing the equation in a form which isolates the sine and cosine of the azimuth orientation of the sensor in an unknown vector, and solving for the unknown vector in a quadratic constrained least squares calculation using static object measurements over a period of time; and
   compensating for the calculated position and azimuth orientation of the object sensor before using the object data in other applications on the host vehicle.

2. The method of claim 1 wherein the static objects are identified as detected objects with a ground speed substantially equal to zero, where a substantially zero ground speed is defined as a ground speed below a predetermined threshold.

3. The method of claim 1 wherein calculating a longitudinal position and a lateral position of the object sensor includes using an equation defining the range rate of each static object in terms of a longitudinal component and a lateral component, writing the equation in a form which isolates the longitudinal position and the lateral position of the sensor in an unknown vector, and solving for the unknown vector in a regression calculation using static object measurements over a period of time.

4. The method of claim 3 wherein the equation is:

$$-\dot{r}=(V_x-b\omega)\cdot\cos(\theta+\alpha)+(V_y+a\omega)\cdot\sin(\theta+\alpha)$$

where $\dot{r}$ is the range rate of the static object, $V_x$ is the longitudinal velocity of the host vehicle, $V_y$ is the lateral velocity of the host vehicle, $\omega$ is the yaw rate of the host vehicle, $\theta$ is the azimuth angle of the static object, $\alpha$ is the azimuth orientation of the sensor on the host vehicle, a is the longitudinal position of the sensor on the host vehicle and b is the lateral position of the sensor on the host vehicle.

5. The method of claim 1 wherein the equation is:

$$-\dot{r}=[(V_x-b\omega)\cos\theta+(V_y+a\omega)\sin\theta]\cos\alpha+[-(V_x-b\omega)\sin\theta+(V_y+a\omega)\cos\theta]\sin\alpha$$

where $\dot{r}$ is the range rate of the static object, $V_x$ is the longitudinal velocity of the host vehicle, $V_y$ is the lateral velocity of the host vehicle, $\omega$ is the yaw rate of the host vehicle, $\theta$ is the azimuth angle of the static object, $\alpha$ is the azimuth orientation of the sensor on the host vehicle, a is the longitudinal position of the sensor on the host vehicle and b is the lateral position of the sensor on the host vehicle.

6. The method of claim 1 wherein the object sensor is a short-range or long-range radar sensor.

7. The method of claim 1 further comprising providing a notification to a vehicle driver or a service center if the calculated position or azimuth orientation of the object sensor is outside of an acceptable pose range.

8. A system for estimating a pose of an object detection sensor on a host vehicle, said system comprising:
   a vehicle dynamics module which receives data from a plurality of vehicle dynamics sensors and a vehicle data bus, said vehicle dynamics model providing vehicle dynamics data for the host vehicle;
   one or more object sensors mounted to the host vehicle, where the object sensors detect objects in a vicinity around the host vehicle; and
   a processor in communication with the vehicle dynamics module and the one or more object sensors, said processor being configured to learn a position and azimuth orientation of the one or more object sensors on the host vehicle using a calculation based on position and motion of static objects detected by the object sensors and the vehicle dynamics data, wherein the processor is configured with an algorithm performing, for each of the one or more object sensors, steps of:
   receiving the vehicle dynamics data from the vehicle dynamics module, where the vehicle dynamics data includes a longitudinal velocity, a lateral velocity and a yaw rate of the host vehicle;
   receiving object data from the object sensor, where the object data includes a range, a range rate and an azimuth angle of each detected object relative to the object sensor;
   identifying static objects from the object data;
   calculating a longitudinal position and a lateral position of the object sensor on the host vehicle based on a recursive calculation using position and motion of the static objects relative to the object sensor;
   calculating an azimuth orientation of the object sensor on the host vehicle based on a recursive calculation using position and motion of the static objects relative to the object sensor, including using an equation defining the range rate of each static object in terms of a longitudinal component and a lateral component, writing the equation in a form which isolates the sine and cosine of the azimuth orientation of the sensor in an unknown vector, and solving for the unknown vector in a quadratic constrained least squares calculation using static object measurements over a period of time; and
   compensating for the learned position and azimuth orientation of the object sensor before using the object data in other applications on the host vehicle.

9. The system of claim 8 wherein the static objects are identified as detected objects with a ground speed substantially equal to zero, where a substantially zero ground speed is defined as a ground speed below a predetermined threshold.

10. The system of claim 8 wherein calculating a longitudinal position and a lateral position of the object sensor includes using an equation defining the range rate of each static object in terms of a longitudinal component and a lateral component, writing the equation in a form which isolates the longitudinal position and the lateral position of the sensor in an unknown vector, and solving for the unknown vector in a regression calculation using static object measurements over a period of time.

11. The system of claim 10 wherein the equation is:

$$-\dot{r}=(V_x-b\omega)\cdot\cos(\theta+\alpha)+(V_y+a\omega)\cdot\sin(\theta+\alpha)$$

where $\dot{r}$ is the range rate of the static object, $V_x$ is the longitudinal velocity of the host vehicle, $V_y$ is the lateral velocity of the host vehicle, $\omega$ is the yaw rate of the host vehicle, $\theta$ is the azimuth angle of the static object, $\alpha$ is the azimuth orientation of the sensor on the host vehicle, a is the longitudinal position of the sensor on the host vehicle and b is the lateral position of the sensor on the host vehicle.

12. The system of claim 8 wherein the equation is:

$$-\dot{r}=[(V_x-b\omega)\cos\theta+(V_y+a\omega)\sin\theta]\cos\alpha+[-(V_x-b\omega)\sin\theta+(V_y+a\omega)\cos\theta]\sin\alpha$$

where $\dot{r}$ is the range rate of the static object, $V_x$ is the longitudinal velocity of the host vehicle, $V_y$ is the lateral velocity of the host vehicle, $\omega$ is the yaw rate of the host vehicle, $\theta$ is the azimuth angle of the static object, $\alpha$ is the azimuth orientation of the sensor on the host vehicle, a is the longitudinal position of the sensor on the host vehicle and b is the lateral position of the sensor on the host vehicle.

13. The system of claim 8 wherein the one or more object sensors are short-range or long-range radar sensors.

14. A smart sensor which continuously learns its pose on a host vehicle while detecting objects, said smart sensor comprising:
a measurement core including a radar transceiver which detects objects in a vicinity around the host vehicle; and
a mounting pose estimator including a processor in communication with the measurement core and a vehicle dynamics module on the host vehicle, said processor being configured to learn a position and azimuth orientation of the smart sensor on the host vehicle using a calculation based on position and motion of static objects detected by the measurement core and vehicle dynamics data from the vehicle dynamics module, wherein the processor is configured with an algorithm performing steps of:
receiving the vehicle dynamics data from the vehicle dynamics module, where the vehicle dynamics data includes a longitudinal velocity, a lateral velocity and a yaw rate of the host vehicle;
receiving object data from the measurement core, where the object data includes a range, a range rate and an azimuth angle of each detected object relative to the smart sensor;
identifying static objects from the object data;
calculating a longitudinal position and a lateral position of the smart sensor on the host vehicle based on a recursive calculation using position and motion of the static objects relative to the smart sensor;
calculating an azimuth orientation of the smart sensor on the host vehicle based on a recursive calculation using position and motion of the static objects relative to the smart sensor, including using an equation defining the range rate of each static object in terms of a longitudinal component and a lateral component, writing the equation in a form which isolates the sine and cosine of the azimuth orientation of the smart sensor in an unknown vector, and solving for the unknown vector in a quadratic constrained least squares calculation using static object measurements over a period of time; and
compensating for the learned position and azimuth orientation of the smart sensor before providing the object data for use in other applications on the host vehicle.

15. The smart sensor of claim 14 wherein calculating a longitudinal position and a lateral position of the smart sensor includes using an equation defining the range rate of each static object in terms of a longitudinal component and a lateral component, writing the equation in a form which isolates the longitudinal position and the lateral position of the smart sensor in an unknown vector, and solving for the unknown vector in a regression calculation using static object measurements over a period of time.

16. A method for estimating a pose of an object detection sensor on a host vehicle, said method comprising:
providing vehicle dynamics data from a vehicle dynamics module on the host vehicle to a processor, where the vehicle dynamics data includes a longitudinal velocity, a lateral velocity and a yaw rate of the host vehicle;
providing object data from an object sensor to the processor, where the object data includes a range, a range rate and an azimuth angle of each detected object relative to the object sensor;
identifying, using the processor, static objects from the object data;
calculating, using the processor, a longitudinal position and a lateral position of the object sensor on the host vehicle based on a recursive calculation using position and motion of the static objects relative to the object sensor, including using an equation defining the range rate of each static object in terms of a longitudinal component and a lateral component, writing the equation in a form which isolates the longitudinal position and the lateral position of the sensor in an unknown vector, and solving for the unknown vector in a regression calculation using static object measurements over a period of time, wherein the equation is:

$$-\dot{r}=(V_x-b\omega)\cdot\cos(\theta+\alpha)+(V_y+a\omega)\cdot\sin(\theta+\alpha)$$

where $\dot{r}$ is the range rate of the static object, $V_x$ is the longitudinal velocity of the host vehicle, $V_y$ is the lateral velocity of the host vehicle, $\omega$ is the yaw rate of the host vehicle, $\theta$ is the azimuth angle of the static object, $\alpha$ is the azimuth orientation of the sensor on the host vehicle, a is the longitudinal position of the sensor on the host vehicle and b is the lateral position of the sensor on the host vehicle;
calculating an azimuth orientation of the object sensor on the host vehicle based on a recursive calculation using position and motion of the static objects relative to the object sensor; and
compensating for the calculated position and azimuth orientation of the object sensor before using the object data in other applications on the host vehicle.

* * * * *